March 14, 1972   M. J. TAUSCHEK   3,649,380
METHOD OF MANUFACTURING HARD FACED EXHAUST VALVES
Filed April 14, 1969
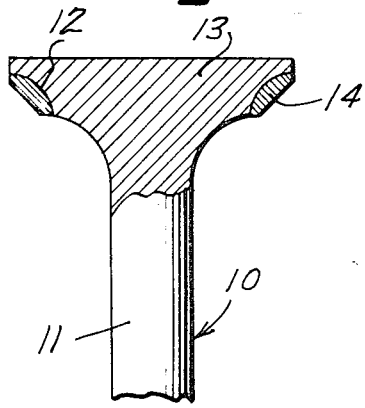
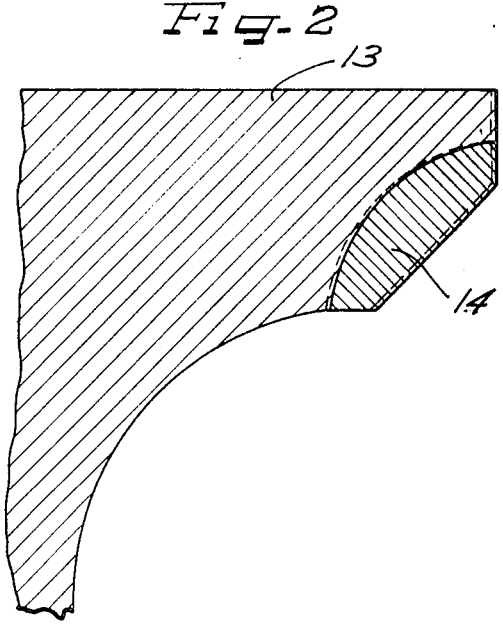
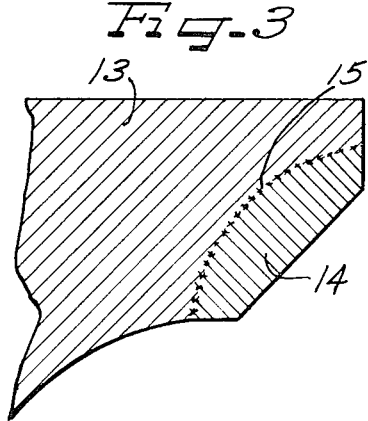
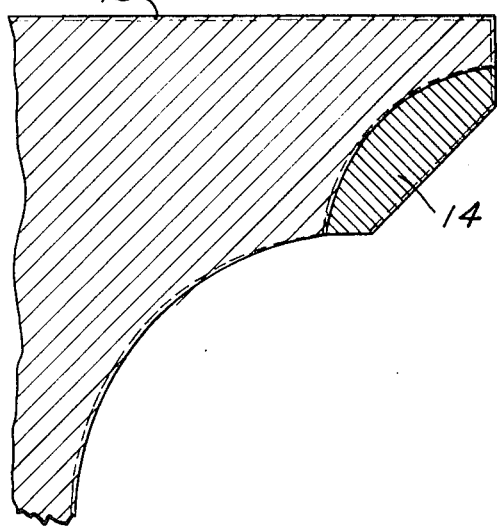
INVENTOR.
Max J. Tauschek United States Patent Office 3,649,380
Patented Mar. 14, 1972

3,649,380
METHOD OF MANUFACTURING HARD FACED EXHAUST VALVES
Max J. Tauschek, South Euclid, Ohio, assignor to TRW Inc., Cleveland, Ohio
Continuation-in-part of application Ser. No. 573,908, Aug. 22, 1966. This application Apr. 14, 1969, Ser. No. 824,343
Int. Cl. B21k 1/22
U.S. Cl. 148—142                6 Claims

ABSTRACT OF THE DISCLOSURE

An internal combustion engine valve prepared by applying a facing material onto the seating face of the valve while the valve body is heated, quenching the applied facing while the valve body is at least partially in a plastic condition to cause the facing material to contract about the valve body, and cooling the valve body to thereby pull the facing material radially inwardly by the contraction of the valve body and to provide a high residual compressive stress in the facing material.

CROSS REFERENCE TO RELATED APPLICATION

This application is a continuation-in-part of my pending application, Ser. No. 573,908 filed Aug. 22, 1966, now abandoned.

BACKGROUND OF THE INVENTION

Field of the invention

The present invention relates to the manufacture of exhaust valves for internal combustion engines wherein a deposit of facing material is applied onto the seating face of a heated valve body, the applied facing is quenched while the valve body is at least partially in a plastic condition so that the deposit of facing material contracts about the valve body, and the valve body is thereafter cooled to pull the facing material radially inwardly by the contraction of the valve body and provide a high residual compressive stress in the facing material.

DESCRIPTION OF THE PRIOR ART

It is common practice in the manufacture of automotive exhaust valves to face the valve on its seating face with a corrosion and abrasion resistant alloy to protect the valve face and enhance the durability of the valve. Generally, the valve body is composed of an austenitic or martensitic steel or a nickel-chromium base alloy. The facing material is generally a nickel-chromium or nickel-chromium-cobalt base alloy which has improved resistance to lead oxide corrosion. The facing material is applied in the form of a ring over the valve seating face ordinarily by oxyacetylene gas or shielded arc electric welding.

In the usual procedure as practiced in the past, the overlay was first welded on to the valve seating face and then the entire valve was subjected to a heat treatment consisting of a solution and aging heat treatment. In this heat treatment, the valve was raised to a temperature of about 2100 to 2200° F., held at this temperature for about 1 hour, and then quenched. The purpose of the heat treatment was to put the carbides in solution so as to develop the maximum creep strength in the alloy. Following the quenching, the valve was raised to a temperature of about 1300 to 1500° F., held at this temperature for about 10 hours and then allowed to cool in air. The purpose of the aging treatment was to produce controlled precipitation of carbides and nitrides so as to develop optimum hardness in the base alloy.

With this type of treatment, it was believed necessary to apply the welded overlay prior to heat treatment of the base material. The thought was that resolutioning of part of the valve head from the heat of welding should be avoided. During the subsequent solution heat treatment, stress relieving would take place and the residual stress level in the valve head and welded face would approach zero. Upon subsequent quenching, the valve base material would contract more than the overlay material, sometimes producing a relatively small net residual compressive stress in the welded overlay. This stress results from the difference in the coefficients of expansion of the overlay and the base materials.

It has now been found that under certain conditions of engine operation, this residual stress can change from compression to tension. Under these circumstances, the valve will frequently fail by radial cracking of the welded overlay. Part of the reason for the change from compression to tension results because of the difference in the coefficients of thermal expansion of the materials used. As the valve head becomes heated during engine operation, the valve base material will expand more than the overlay material, thus reducing the amount of compressive stress in the overlay. Another contributing factor is the fact that the center of the valve head will ordinarily operate at a temperature of 150 to 250° F., hotter than the outer diameter of the valve head, further contributing to the stress of the welded overlay.

Another disadvantage of the conventionally used process is the fact that the welded overlay is subjected to a temperature of about 2150° F. for a prolonged period of time during the solution heat treatment. This can produce undesirable precipitation reactions in the overlay material.

SUMMARY OF THE INVENTION

I have now found that a welded overlay can be provided with a substantial residual compressive stress by altering the thermal history of the faced valve from the sequence which was heretofore carried out. Specifically, I have found that the facing should be quenched before any significant cooling of the valve body takes place, nd while the valve body is at least partially in a plastic condition. Under these conditions, the deposit of facing material contracts about the valve body during quenching. Subsequent cooling of the welded body causes the body material to pull the facing material radially inwardly by the contraction of the valve body and provides a very high residual compressive stress in the facing material. By the method of the present invention, the residual compressive stress is made to be at least about 15,000 pounds per square inch, and is usually in the range from about 20,000 to 40,000 pounds per square inch.

BRIEF DESCRIPTION OF THE DRAWING

FIG. 1 is a fragmentary view, partially in cross-section of a completed valve produced according to the present invention;

FIG. 2 is an enlarged fragmentary view in cross-section illustrating the manner in which the weldment contracts about the plastically deformable valve body upon quenching of the weldment;

FIG. 3 is a greatly enlarged fragmentary cross-sectional view illustrating schematically the location of the weld joint at the interface between the facing material and the valve body; and FIG. 4 is a greatly enlarged fragmentary cross-sectional view illustrating the manner in which the valve body contracts during cooling and further stresses the previously applied weld deposit.

DESCRIPTION OF THE PREFERRED EMBODIMENTS

The method of the present invention is applicable to the types of valve body metals and facing materials which have heretofore been employed in the prior art. The following table lists the compositions of some conventional facing materials, purely by way of example:

|    | "Stellite F"   | "Stellite 6"   | "X-782"       |
|----|----------------|----------------|---------------|
| C  | 1.50-2.00      | 0.90-1.40      | 1.75-2.25.    |
| Cr | 24.00-27.00    | 26.00-30.00    | 25.00-27.00.  |
| Ni | 21.00-24.00    | 3.00 maximum   | Balance.      |
| W  | 11.50-13.00    | 3.50-5.50      | 8.00-9.40.    |
| Fe | 2.00 maximum   | 3.00 maximum   | 4.00 maximum. |
| Si | 0.50-1.50      | 0.70-1.70      | 0.50 maximum. |
| Mo | 0.60 maximum   | 1.00 maximum   |               |
| Mn | 0.30 maximum   | 0.50 maximum   | 0.50 maximum. |
| Co | Balance        | Balance        | 0.30 maximum. |

In the following table, there are listed compositions for the valve body material, again selecting typical analyses of commonly used materials:

|    | "A"           | "B"            | "C"            |
|----|---------------|----------------|----------------|
| C  | 0.457-0.575   | 0.15-0.25      | 0.76-0.86.     |
| Cr | 20.00-22.00   | 20.00-22.00    | 19.00-21.00.   |
| Ni | 3.25-4.50     | 10.50-12.50    | 1.00-1.60.     |
| Si | 0.25 maximum  | 0.70-1.25      | 1.90-2.60.     |
| Mn | 8.00-10.00    | 1.00-1.50      | 0.20-0.60.     |
| S  | 0.04-0.90     | 0.030 maximum  | 0.030 maximum. |
| P  | 0.030 maximum | 0.030 maximum  | 0.030 maximum. |
| N  | 0.38-0.50     | 0.15-0.20      |                |
| Fe | Balance       | Balance        | Balance.       |

Alloys "A" and "B" can be solution treated and aged as described previously, while alloy "C" is heat treated by hardening (1900-2000° F. for about 15 minutes), quenching, and then drawing at about 1300° F. for about one hour, followed by air cooling. The hardening is preferably performed before application of the facing, and the drawing is preferably done afterwards.

In FIG. 1, reference numeral 10 indicates generally a poppet type exhaust valve including a valve stem portion 11, a valve seating face 12, and a valve head 13. A ring 14 of a corrosion and abrasion resistant material is welded to the valve body in the area of the valve seating face 12.

The ring 14 may be applied to a pre-heated valve body by means of oxyacetylene gas or shielded-arc electric welding. The temperature of the valve body immediately after the welding operation is still within about 400° F. of its solidus temperature, so that it is in a state in which it is capable of plastic deformation. Then, when the ring 14 is quenched, preferably in oil, the ring 14 cools first, shrinking around the valve body material and causing plastic flow to occur in the valve head. The initial size of the ring 14 is illustrated in solid line in FIG. 2, while the displaced position of the ring 14 is illustrated in the dashed line of the same figure. Subsequently, the base material cools, contracting as it does so, and pulling in the facing ring 14 due to the existence of the weld joint between the two elements. The resulting contraction of the base material and the further contraction of the ring 14 are illustrated by the dashed lines in FIG. 4. The result is a production of a very high level of circumferential residual compressive stress in the overlay ring 14. This residual stress is sufficiently high so that the stress on the valve face always remains compressive during operation and the valve face does not crack. Furthermore, since the overlay alloy is cooled immediately after welding and is not subjected to any subsequent heat treatment, precipitation reactions are avoided and there are no embrittling effects on the welded overlay.

The residual compressive stresses in the facing ring were measured by the following technique. First, the outside diameter of the valve was very carefully measured. Then, the valve was put into a lathe and a parting tool was used to cut through the base material just behind the facing ring. The base material was very carefully machined away, leaving the facing ring by itself. In some cases, an acid etch was used which preferentially attacked the base material, but not the facing, so as to remove the last vestiges of the base material. Following these operations, the outside diameter of the facing ring was again remeasured. The change of diameter was then related to the residual compressive stress by the modulus of elasticity of the facing material.

In this procedure, prior to machining away the base material, there are residual radial tensile stresses at the weld juncture between the base and facing material. These stresses pull the facing ring radially inwardly, thus creating the residual circumferential compressive stresses of substantial magnitude which characterize the valves of the present invention. When the base material is machined away, the radial stresses are eliminated. Consequently, the circumferential stresses are also relieved. The amount of the circumferential stress that existed in the valve prior to the machining operation is therefore determined by the expansion in the facing ring that takes place when the circumferential stresses are relieved.

Substantial experimental work has demonstrated that the valves made according to the process of the present invention have improved performance as compared to valves produced by the older techniques. In one set of experiments, the valve heads of valves made with the process of the present invention and those made by the prior technique were heated by a torch to a temperature of about 1400° F., and then seated against a water cooled seat and abruptly cooled to a temperature of about 300° F. This cycle was repeated until the valve face cracked. With valves made by the old process, failure would occur between 210 and 275 cycles. Valves made by the process of the present invention ran from 409 to 900 cycles before failure.

Engine tests were made in vehicles in which one half of the valve were made by the old process, and one half by the process of this invention. Valve face cracking was encountered in each instance with one or more of the valves from the old process after an extended period of field operation. No cracking was experienced with valves produced from the process of the present invention.

From the foregoing, it will be understood that the process of the present invention which provides for cooling the welded overlay from the outside in while plastically deforming the material underneath results in a highly improved valve facing being provided. The magnitude of the residual compressive stresses is such that the overlay ring never goes into tension during operation in the engine.

It should be evident that various modifications can be made to the described embodiment without departing from the scope of the present invention.

I claim as my invention:

1. The method of facing a valve for an internal combustion engine which comprises welding a facing deposit of a corrosion and wear resistant material onto the seating face of a heated valve body, quenching the applied facing while the valve body is at least partially in a plastic condition, thereby causing the deposit of facing material to contract about the valve body and causing plastic flow to occur in said valve body, and subsequently cooling the valve body to thereby pull the facing material radially inwardly by the contraction of said valve body and provide a high residual compressive stress of at least 15,000 p.s.i. in the facing material.

2. The method of claim 1 in which the quenching is carried out while the valve body has a temperature within about 400° F. of its solidus temperature.

3. The method of facing a valve for an internal combusion engine which comprises solution treating a valve body containing carbides to put carbides in solution, aging the resulting valve body to cause precipitation of carbides in the solution treated body, thereafter welding a facing deposit of corrosion and wear resistant material onto the seating face of said valve body, quenching the applied facing while the valve body is at least partially in a plastic condition, thereby causing the deposit of facing material to contract about the valve body and causing plastic flow to occur in said valve body, and subsequently cooling the valve body to thereby pull the facing material radially inwardly by the contraction of said valve body and providing a high residual stress of at least 15,000 p.s.i. in the facing material.

4. The method of claim 3 in which said residual compressive stress is in a range from about 20,000 to about 40,000 p.s.i.

5. The method of claim 3 in which said solution treating is carried out at a temperature of about 2100 to 2200° F.

6. The method of claim 3 in which said aging is carried out at a temperature of about 1300 to 1500° F.

References Cited

UNITED STATES PATENTS

| | | | |
|---|---|---|---|
| 3,147,747 | 9/1964 | Kittelson | 29—156.7 R |
| 3,349,463 | 10/1967 | Kittleson | 29—156.7 X |
| 1,557,022 | 10/1925 | Chilton | 29—156.7 C |
| 1,721,197 | 7/1929 | Almen | 29—447 X |
| 2,089,749 | 8/1937 | Jardine | 29—447 X |
| 2,136,690 | 11/1938 | Jardine | 29—156.7 A |
| 2,145,864 | 2/1939 | Denneen et al. | 29—447 X |
| 2,267,665 | 12/1941 | Raydt et al. | 29—473.5 |
| 2,401,006 | 5/1946 | Longoria et al. | 29—156.7 R |
| 2,633,633 | 4/1953 | Bogart et al. | 148—127 X |
| 2,671,726 | 3/1954 | Jennings | 148—142 X |
| 3,097,092 | 7/1963 | Dyrkacz et al. | 148—142 X |
| 3,126,214 | 3/1964 | Wong et al. | 29—447 X |

FOREIGN PATENTS

| | | | |
|---|---|---|---|
| 147,995 | 11/1909 | Germany | 29—473.5 |

CHARLES N. LOVELL, Primary Examiner

U.S. Cl. X.R.

29—156.7 R, 156.7 A, 487; 123—188 AA; 148—34, 127